Aug. 5, 1969 R. E. MATICK 3,460,111

THICK FILM READ-ONLY MEMORY

Filed Oct. 15, 1965

INVENTOR.
RICHARD E. MATICK

BY S. P. Tedesco

ATTORNEY

United States Patent Office 3,460,111

Patented Aug. 5, 1969

3,460,111

THICK FILM READ-ONLY MEMORY

Richard E. Matick, Peekskill, N.Y., assignor to International Business Machines Corporation, Armonk, N.Y., a corporation of New York Filed Oct. 15, 1965, Ser. No. 496,455

Int. Cl. G11b *5/00*

U.S. Cl. 340—174 19 Claims

ABSTRACT OF THE DISCLOSURE

The read-only memory includes a plurality of magnetic thick films. Each film exhibits an easy axis of magnetization but the self-demagnetizing force is greater than the coercive force, which causes the magnetization to split up into several domains oriented in opposite directions along the easy axis. Information is entered by a card containing magnets at positions adjacent selected films. The magnets apply an easy axis field. The interrogate conductors are arranged parallel to the film's easy axis and apply hard axis fields to read out information. The sense conductors are arranged parallel to the film's hard axis and sense easy axis flux changes easy axis.

This invention relates to read-only memory arrays and, more particularly, to read-only memory arrays employing thick magnetic films having uniaxial anisotropic characteristics as storage elements and wherein "sneak paths" during readout are eliminated.

A read-only memory array is defined as one wherein information is stored either on a permanent or semi-permanent basis and is continuously available on a nondestructive basis. Read-only memory arrays, for example, find application in high performance computers to store information which is changed relatively infrequently, e.g., programs, statistical data, statistical tables, etc. Memory arrays of the read-only type are preferred due to their inherent faster cycle time, more simplified construction, and lower cost as compared with corresponding memory arrays of the read-write type.

Due to the fast speed requirements of present day computers, extensive efforts have been directed toward the development of magnetic films as storage elements for memory applications. Essentially, a magnetic film useful for such applications is formed of a layer of magnetic material deposited onto a substrate in the presence of a static magnetic field. Such film, for example, may be formed of a Permalloy material comprising 80% nickel (Ni) and 20% iron (Fe). The static magnetic field is applied parallel to the substrate plane and induces a preferred "easy" axis of magnetization aligned with the applied magnetic field; a "hard" axis of magnetization is displaced 90° from this induced "easy" axis of magnetization. A magnetic film exhibiting an "easy" and a "hard" axis of magnetization in the absence of an applied magnetic field is said to exhibit uniaxial anisotropic characteristics.

When the self-demagnetizing force $H_D$ is less than the coercive force $H_C$, a magnetic film behaves as a single-domain and binary states are defined by the orientation of its magnetization in either direction along the "easy" axis. However, when a magnetic film is of a particular geometry and thickness whereby the self-demagnetizing force $H_D$ is greater than the coercive force $H_C$, such film disassociates into several domains, the respective magnetizations of adjacent domains being aligned in parallel but opposite directions along the "easy" axis. A fuller understanding of domain theory may be had by reference to "Computers and Switching" by E. M. Gyorgy, which appeared in the Journal of Applied Physics, May, 1960, supplement to vol. 31, No. 5, pages 110S through 117S and, also, "Physical Theory of Ferromagnetic Domains," by Charles Kittel, which appeared in the Reviews of Modern Physics, 1949, vol. 21, pages 541 through 583. Such thick magnetic films are, per se, ineffective to define binary states. This inability to define binary states has precluded consideration of thick magnetic films in read-write memory arrays. On the other hand, thick magnetic films have been employed as the basic storage element in read-only memory arrays, for example, as described in application Ser. No. 159,432, now Patent No. 3,298,005, entitled "Thick Film Read-Only Memory," by R. E. Matick, which was filed on Dec. 14, 1961 and assigned to a common assignee. In such read-only memory array, a second binary state, albeit semi-permanent, is defined by external biasing magnetic fields of sufficient intensity to saturate a selected thick magnetic film.

A problem common to memory arrays, in general, is the presence of "sneak paths" whereby energized sense lines are coupled via the particular storage elements to unenergized word lines and then, in turn, to unenergized sense lines. The presence of "sneak paths" can severely limit the maximum practical size of a memory array. To achieve reliable operation and, also, optimize storage capacity, "sneak paths" within a memory array, whether two-dimensional or three-dimensional and whether magnetic or nonmagnetic, must be eliminated. In magnetic memory arrays, a "sneak path" arises due to bidirectional coupling by a magnetic storage element of the word and sense lines. For example, in the read-only memory described in the above-identified patent application, such bidirectional coupling via the magnetic storage element defining a particular information bit slot is disabled to indicate storage of a first binary quantity and enabled to dicate storage of a second binary quantity. Accordingly, when such bidirectional coupling is enabled, sense signals induced along a sense line are coupled to unenergized word lines. Such a sense line in a coordinate array is coupled to each word line, and "sneak path" effects are cumulative along each unenergized word line and, in turn, cumulative along each unenergized sense line. In a worst case condition, and unenergized sense line can be sufficiently coupled whereby false readout occurs. To insure reliable operation, the capacity of prior art read-only memory arrays have been purposefully limited due to the presence of "sneak paths." The elimination of "sneak paths" in a read-only memory array would allow for increased storage capacity to better satisfy the requirements of present day systems.

An object of this invention is to provide a large capacity read-only memory employing thick magnetic films as the basic storage element and wherein "sneak paths" are eliminated.

Another object of this invention is to provide a read-only memory wherein "sneak paths" are avoided by taking full advantage of the anisotropic characteristics of thick magnetic films.

Briefly, and in accordance with the principles of this invention, these and other objects and advantages are obtained by utilizing the anisotropic characteristics of thick magnetic films to provide unidirectional coupling as distinguished from bidirectional coupling between word and sense lines.

In the preferred embodiment of this invention, a stored "0" is indicated by the thick magnetic film being in a demagnetized, or multi-domain, state whereas a stored "1" is indicated by such film being saturated along the "easy" axis by an external biasing field. During readout, the magnetization of an interrogated thick magnetic film is rotated into the "hard" axis and the net flux change along the "easy" axis is sensed. When a thick magnetic film is demagnetized (stored "0") whereby the magnetizations of adjacent domains are oppositely poled, there is no flux change along the "easy" axis during readout since the respective contributions of adjacent domains are subtractive. When a thick magnetic film element is saturated along the "easy" axis (stored "1"), such film acts as a single-domain film to provide a net flux change along the "easy" axis during readout whereby a signal is induced along the sense line.

Due to peculiar orientation of the word and sense lines with the anisotropy of the individual thick magnetic films, there is no back-coupling of sense signals to unenergized word drive lines. Magnetic fields generated by energized sense lines are directed along the "easy" axis of uninterrogated thick magnetic films whereas word lines are coupled to such films along the "hard" axis. The net flux change along the "hard" axis, however, is substantially zero whether or not a thick magnetic film is demagnetized or saturated. For example, while a thick magnetic film is saturated (stored "1"), magnetic fields generated by an energized sense line are of insufficient intensity to disturb its magnetization. While a thick magnetic film is demagnetized (stored "0"), magnetic fields generated by an energized sense line tend to switch such film from a multi-domain to a single-domain state. However, the sense signal is not coupled to an unenergized word line since (1) switching to a single-domain state occurs by domain wall motion which requires a critical, or threshold, magnetic field and (2) if any switching does occur, there is no net flux change along the "hard" axis. Accordingly, "sneak paths" are eliminated in the read-only memory array due to the anisotropic properties of the thick magnetic films and also, the particular orientation of the word and sense lines with respect thereto.

The foregoing and other objects, features and advantages of the invention will be apparent from the following more particular description of preferred embodiments of the invention, as illustrated in the accompanying drawings.

Figures 1, 2A, 2B, 3A, 3B, 4, 5:
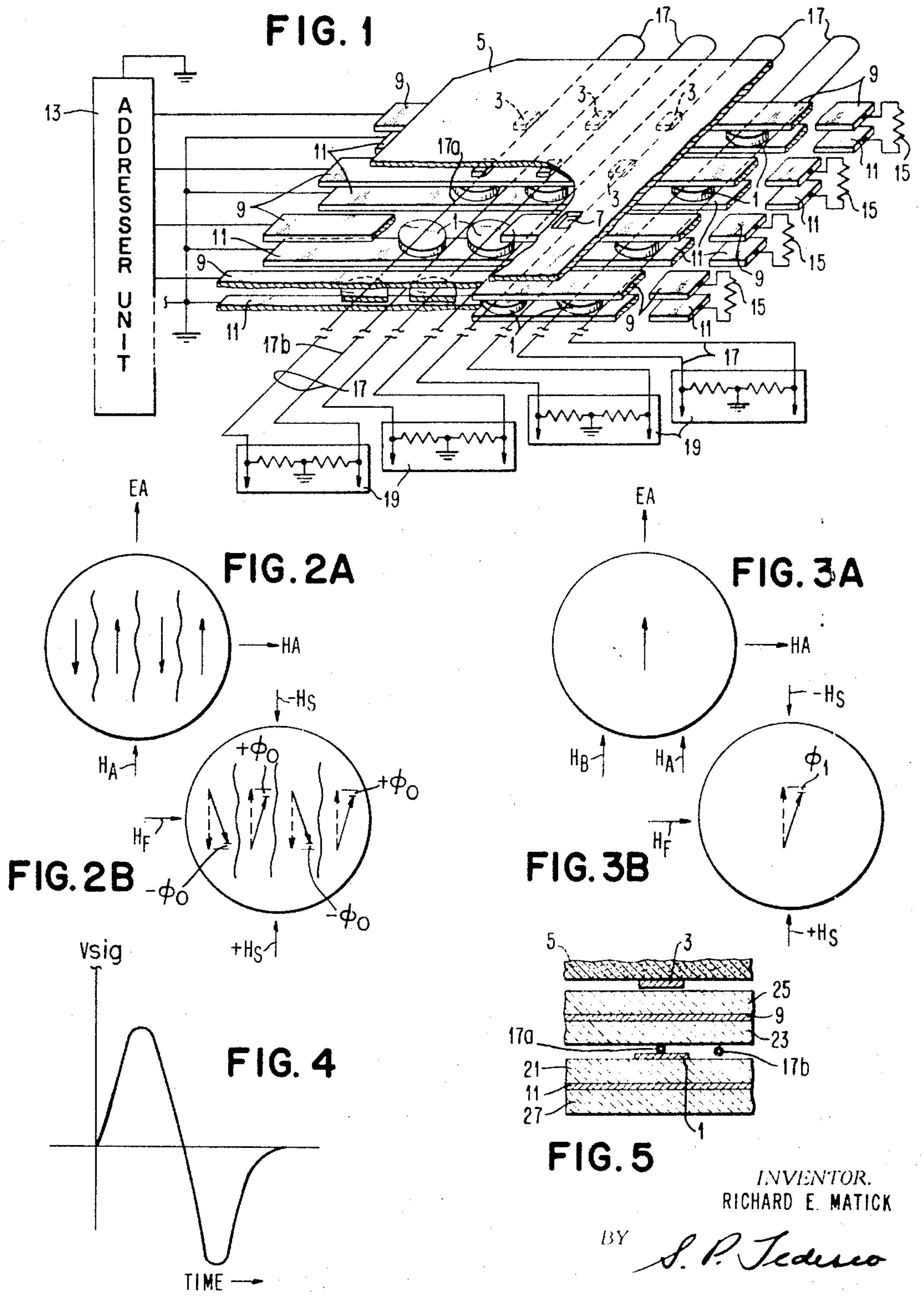
FIG. 1 shows an isometric, partially exposed view of a two-dimensional memory device wherein thick magnetic films are employed as storage elements.
FIG. 2A illustrates the multi-domain structure of a thick magnetic film.
FIG. 2B illustrates the rotation of the magnetization of a thick magnetic film of FIG. 2A.
FIG. 3A illustrates the effect of external biasing fields when saturating the thick magnetic film of FIG. 2A.
FIG. 3B illustrates the rotation of the magnetization of the saturated thick magnetic film of FIG. 3A.
FIG. 4 depicts an output signal developed along a sense line during the readout of a demagnetized thick magnetic film.
FIG. 5 is a cross-sectional view of a single thick magnetic film arrangement in the read-only memory array of FIG. 1.

Referring now to FIG. 1, a two-dimensional read-only memory in accordance with the principles of this invention comprises a plurality of thick magnetic films 1 selectively arranged in rows and columns so as to define a plurality of distinct word addresses. While only a portion of the read-only memory is illustrated, this portion may be extended to include any practical number of word addresses having any desired number of information bit slots, each bit slot being defined by a thick magnetic film 1.

Information is stored in the read-only memory of FIG. 1 by external biasing fields $H_B$ which are applied on a semipermanent basis to saturate particular ones of the thick magnetic films 1. As shown, a permanent magnet 3 is positioned to apply biasing fields $H_B$ to saturate a particular thick magnetic film 1. As shown, a plurality of magnets 3 can be supported on an "I.B.M."-type card 5 in rows and columns corresponding to the array of thick magnetic films 1. When card 5 is properly positioned, each magnet 3 is supported to apply biasing fields $H_B$ along the "easy" axis EA of a corresponding thick magnetic film 1. Magnets 3 may be formed, for example, of very thin (3–5 mils) rubber base permanent magnets, the field strength of such magnets being at least sufficient to overcome the coercive force $H_C$ and the self-demagnetizing force $H_D$ inherent in thick magnetic films 1 whereby such films are saturated along the "easy" axis EA to define a first binary state. In the absence of a magnet 3 in a particular position on the card 5, for example, as indicated at 7, a corresponding thick magnetic film 1 is completely demagnetized so as to disassociate into multiple domains aligned in parallel but opposite directions along the "easy" axis EA to define a second binary state. This last-defined binary state is one towards which the magnetization of a thick magnetic film 1 necessarily gravitates in the absence of external biasing fields $H_B$.

Accordingly, the stored information in the read-only memory array of FIG. 1 is particularly defined by the arrangement of magnets 3 on card 5. Moreover, the stored information is conveniently and rapidly changed by the substitution of cards 5 having different predetermined arrangements of magnets 3. A desired arrangement of magnets 3 is easily obtained by using card punch techniques whereby selected magnets 3 are removed from an array provided in card 5. Card 5 may be selectively interchanged and accurately positioned by proper guides and stops, not shown, obvious to one skilled in the art. Alternatively, any arrangement of magnetic field-generated means can be utilized to store information in the array of thick magnetic films 1.

Thick magnetic films 1 comprising each word address are positioned between a pair of parallel strip line conductors 9 and 11. The "easy" axis EA of each thick magnetic film 1 is oriented along the length of the corresponding pair of strip line conductors 9 and 11. Each strip line conductor 9 is connected to an addresser unit 13, the corresponding end of the corresponding strip line conductor 11 being returned to ground to define a strip transmission line terminated by resistor 15. Addresser unit 13, which may be of conventional type, selectively energizes particular ones of the strip line conductors 9 and 11 to generate interrogating fields $H_F$ perpendicular to the "easy" axis EA to rotate the magnetization of interposed thick magnetic films 1 into the "hard" axis HA.

A plurality of sense loops 17 are interposed between strip conductors 9 and 11 and each is inductively coupled to corresponding thick magnetic films 1 in each word address. Each sense loop 17 is formed of a thin wire, portion **17*a* being inductively coupled to sense flux changes along the "easy" axis EA of corresponding thick magnetic films 1. Also, portion 17*b* of sense loop 17 is positioned intermediate adjacent thick magnetic films 1 to provide a balanced system to reduce noise. Sense loops 17 are connected to differential amplifiers 19, respectively, which may be of conventional type. Differential amplifiers 19 effectively eliminate noise which might be generated in sense loop 17 during readout, e.g., due to coupling between sense loops 17 and strip line conductors 9 and 11. However, if stropping techniques are employed, conventional means may be substituted in lieu of differential amplifiers 19**.

In the fabrication of the read-only memory shown in FIG. 1, dielectric layers are preferably employed between thick magnetic films 1, strip line conductors 9 and 11, and the sense loops 17. For example, as shown in FIG. 5, the thick film read-our memory may be fabricated by depositing thick magnetic films of predetermined geometry and thickness to induce a self-demagnetizing force $H_D$ in excess of the coercive force $H_C$ onto an epoxy glass substrate 21. For example, the thick magnetic films 1 can be of circular geometry and having a diameter equal to approximately 1/16 of an inch and a thickness between 4000 A. and 20,000 A. although other geometrical dimensions are suitable. Sense loops 17 can be printed or cemented onto a substrate 23 and portion 17*a* aligned with the diameter of thick magnetic film 1 so as to sense flux change along the "easy" axis EA. Strip line conductors 9 and 11 are deposited or cemented onto opposite faces of epoxy glass substrates 23 and 21, respectively, to be aligned above and below particular thick magnetic films 1 comprising a corresponding word address. Additional substrates 25 and 27 are provided to protect strip line conductors 9 and 11, respectively, Also, card 5 is supported in spaced-fashion over substrate 25 to position magnets 3, when present, over corresponding thick magnetic films 1. Each magnet 3 is arranged to apply biasing fields $H_B$ along the "easy" axis EA of the corresponding thick magnetic film 1. In other words, the magnetization of each of the multi-domains defined in the thick magnetic film 1 (c.f., FIG. 2A), are each aligned in parallel fashion whereby the net magnetization is represented by a single-domain oriented along the "easy" axis EA (cf., FIG. 3A).

To more fully understand the read-only memory of this invention, reference is initially made to FIGS. 2A and 3A which illustrate the domain structure of a thick magnetic film 1 when completely demagnetized (multi-domain state) to indicate a stored "0" and when saturated along the "easy" axis EA (single-domain state) to indicate a stored "1." As hereinabove described, a thick magnetic film 1 is saturated by biasing fields $H_B$ parallel to the "easy" axis EA. Normally, anisotropic force $H_A$ induced in thick magnetic film 1 when deposited in the present of a static magnetic field tends to maintain the net magnetization along a preferred "easy" axis EA. In addition, such thick magnetic film 1 is characterized by a coercive force $H_C$ which tends to maintain the magnetization as a single-domain aligned along the "easy" axis EA. However, as the thickness is increased while the geometry is maintained constant, a self-demagnetizing force $H_D$ is built up within thick magnetic film 1. For a circular geometry, self-demagnetizing force $H_D$ in oersteds at the center of a magnetic film is approximately given by $H_D=B_S T 10^{-7}/32D$, where $B_S$ is the saturation flux density in gauss, T is the thickness in angstroms and D is the diameter in inches. When the self-demagnetizing force $H_D$ exceeds the coercive force $H_C$, the thick magnetic film 1 tends to disassociate into multiple domains which align in parallel but opposite directions as indicated by the arrows in FIG. 2A whereby the net magnetization along the "easy" axis EA is minimized. Such disassociation is primarily due to the large self-demagnetizing force $H_D$ inherent in thick magnetic films and precludes the use of such films, per se, as binary storage elements. Thick magnetic films 1 are distinguishable from thin magnetic films which behave as a single domain.

When an external biasing field $H_B$ is applied along the "easy" axis EA of thick magnetic film 1, the magnetization of the individual domains align in parallel fashion as a single-domain along the "easy" axis EA as indicated in FIG. 3A. The intensity of biasing fields $H_B$ should at least satisfy the expression $H_D+H_C \leqq H_B$. When saturated, therefore, a thick magnetic film 1 acts essentially as a thin magnetic film having uniaxial anistropic characteristics; biasing fields $H_B$, in effect, supplement the coercive force $H_C$ and maintain the net magnetization along the "easy" axis EA.

The read-only memory hereinabove described is characterized in that information readout is effected by interrogating fields $H_F$ applied the "hard" axis HA of thick magnetic films 1 defining a word address while the net flux change along the "easy" axis EA is sensed. Due to the particular orientation of portions 17*a* of sense loops 17, magnetic fields $H_S$ generated by current signals along sense loops 17 are applied along the "easy" axis EA of adacent thick magnetic films 1. Due to the peculiar anistropic characteristics of thick magnetic films 1, there is substantially no net flux change along the "hard" axis HA when magnetic fields $H_S$ are applied along the "easy" axis EA. Accordingly, sense loops 17 and unenergized strip line conductors 9 and 11 are decoupled during readout and "sneak paths" in the read-out memory of FIG. 1 are totaly eliminated.

For example, during readout, energization of a particular pair of strip line conductors 9 and 11 applies interrogating fields $H_F$ such that the magnetization of interpositioned thick magnetic films 1, whether in a stored "1" state (saturated along the "easy" axis EA) or in the stored "0" state (completely demagnetized), are each rotated into the "hard" axis HA as shown in FIGS. 2B and 3B, respectively. When the thick magnetic film 1 is in a stored "0" state, interrogating fields $H_F$ rotate the magnetization of adjacent domains in clockwise and counterclockwise directions, respectively, and tend to switch the film element to a single-domain state along the "hard" axis HA. The net component of flux change along the "easy" axis EA, however, is zero since the respective contributions of oppositely-oriented domains are subtractive. For example, as shown in FIG. 2B, individual domains having a magnetization parallel to the indicated "easy" axis EA contributed a positive flux change $+\phi_0$ whereas domains having an oppositely-oriented magnetization contributed a negative flux change $-\phi_0$ along the "easy" axis EA. Accordingly, the net flux change along the "easy" axis EA of a thick magnetic film 1 in a stored "0" state is zero throughout the readout cycle. At the termination of the readout cycle, self-demagnetizing force $H_D$ tends to reorient the individual domains along the "easy" axis EA whereby net flux change along the "easy" axis EA is again zero. Accordingly, no sense signal is induced along a sense loop 17 which is indicative of a stored "0."

When a thick magnetic film 1 is interrogated in a stored "1" as shown in FIG. 3A, interrograting fields $H_F$ rotate the net magnetization into the "hard" axis HA. Rotation of the magnetization causes a net flux change $\phi_1$ along the "easy" axis EA to induce a sense signal along sense loop 17 indicative of a stored "1." The sense signal induced along sense loop 17 is illustrated in FIG. 4, the positive excursion being induced during the rise time of the interrogation pulse when the magnetization of the interrogated thick magnetic film 1 is rotated into the "hard" direction HA. Upon termination of the interrogation pulse, anisotropic force $H_A$ and also biasing field $H_B$ accelerate reorientation of the magnetization of the interrogated thick magnetic film 1 along the "easy" axis EA. During such reorientation, the resulting reversal of flux along the "easy" axis EA induces a current signal of opposite polarity along the sense loop 17 as illustrated in FIG. 4. Accordingly, the presence of a sense signal along sense loop 17 is indicative of the interrogation of a thick magnetic film 1 (saturated). The sense signal induced along a sense loop 17 as illustrated in FIG. 4 is somewhat idealized so as to depict an induced sense signal for an interrogation pulse having equal rise and fall times.

Due to the particular arrangement of sense loops 17 and also strip line conductors 9 and 11 with respect to the anisotropy of the thick magnetic films 1, back-coupling of sense signals from energized sense loops 17 to undriven strip line conductors 9 and 11 is avoided. The sense signal along a sense loop generates magnetic fields $H_S$ which are reversible and along the "easy" axis EA of other thick magnetic films 1 in corresponding information bit slots of remaining word addresses. Since strip line conductors 9 and 11 are coupled to sense the net flux change along the "hard" axis HA and since the net flux change along the "hard" axis HA produced by the reversible magnetic fields $H_S$ is substantially zero due to the anisotropic characteristics of thick magnetic film elements 1, unenergized strip line conductors 9 and 11 are effectively decoupled.

For example, with good alignment of the "easy" axis of thick magnetic films 1 along strip line conductors 9 and 11, the bipolar sense signal illustrated in FIG. 4 along sense loop 17 generates successive magnetic fields $+H_S$ and $-H_S$ which are parallel and anti-parallel, respectively, to the "easy" axis EA. When saturated by biasing fields $H_B$ (stored "1"), the magnetization of a thick magnetic film 1 is not disturbed since there is initially no net torque on the magnetization and, in the practical case, the intensity of anti-parallel fields $-H_S$ is not sufficient to overcome the effect of biasing fields $H_B$. Normally, the magnitudes of sense current signals induced along sense loops 17 during readout are in the range of 0.1 milliampere or smaller which are effective to produce magnetic fields $H_S$ having an intensity on an order of 0.5 oersted. Biasing fields $H_B$, in effect, define a threshold which must be overcome before the magnetization of a thick magnetic film 1 in a stored "1" state is disturbed by anti-parallel magnetic fields $-H_S$. Regardless, even if such threshold is overcome whereby the magnetization of an otherwise saturated thick magnetic film 1 is disturbed, the net flux change along the "hard" axis HA is substantially zero. For example, while a thick magnetic film 1 is in a stored "1" state, such film is in a state of unstable equilibrium. In the event that the intensity of the anti-parallel magnetic fields $-H_S$ is sufficient to overcome the effects of biasing fields $H_B$, the thick magnetic film 1 tends to disassociate into multiple domains (cf., FIG. 2A) which tend to align in the direction of applied field. Statistically, however, an equal number of magnetic moments rotate in each direction, i.e., clockwise and counter-clockwise, so that the net flux along the "hard" axis HA and coupling strip line conductors 9 and 11 is substantially zero and back-coupling of the sense signal is avoided. This is similar to the situation wherein a magnetic film 1 in a stored "0" state is disturbed, as hereinafter more fully described.

Similarly, there is no back-coupling of a sense signal to unenergized strip line conductors 9 and 11 along a thick magnetic film 1 in the stored "0" state. Reversible magnetic fields $+H_S$ and $-H_S$ applied along the "easy" axis EA of an uninterrogated thick magnetic film 1 have an identical effect. For example, magnetic fields $+H_S$ and $-H_S$ tend to affect only domains having a magnetization opposite to the direction of applied magnetic field. Regardless, the net flux change along the "hard" axis HA of a thick magnetic film 1 is substantially zero and no current is induced along strip line conductors 9 and 11. Rotation of anti-parallel domains in a demagnetized thick magnetic film 1 occurs by domain wall motion and, as such, the reversal of the magnetization occurs in a plane parallel with the "easy" axis EA. Accordingly, there is no component of net flux change along the "easy" axis EA due to magnetic fields $+H_S$ and $-H_S$ and unenergized pairs of strip line conductors 9 and 11 effectively decoupled. Moreover, a threshold condition also exists in the case of the completely demagnetized thick magnetic film 1 due to the coercive force $H_C$. In the event that thick magnetic film 1 is not completely demagnetized and is in one of its remanent states, a threshold as determined by the coercive force $H_C$ exists for only one polarity of magnetic fields $H_S$; with respect to the opposite polarity magnetic fields $H_S$, the magnetization of a thick magnetic film 1 is disturbed. Regardless, if the magnetization of a thick magnetic film 1 is disturbed for either case, an equal number of magnetic moments are rotated, on a statistical basis, in opposite directions in a plane parallel to the "easy" axis EA whereby the net flux change long the "hard" axis HA is substantially zero. Accordingly, unenergized pairs of strip line conductors 9 and 11 are effectively decoupled from an energized sense loop 17.

While the magnetic storage element has been described as a thick magnetic film wherein the self-demagnetizing force $H_D$ exceeds the coercive force $H_C$, it is also possible to define a multi-domain state in a thin magnetic film. A thin magnetic film is defined as one wherein the coercive force $H_C$ exceeds the self-demagnetizing force $H_D$. For example, when a thin magnetic film is driven hard into the "hard" axis HA, such film disassociates into several domains which align in anti-parallel fashion along the "easy" axis EA. Accordingly, when thin magnetic films are employed as storage elements in the read-only memory of FIG. 1, each film can be disassociated, for example, by external magnetic fields applied along the "hard" axis HA to indicate a stored "0;" card 5 with a predetermined arrangement of magnets 3 can be subsequently positioned as shown in FIG. 1 to store information. Alternatively, thick magnetic films can be employed in the array of FIG. 1 and saturated in opposite directions along the "easy" axis EA by permanent magnets 3 in opposite polarity to indicate a stored "0" and a stored "1," respectively. Such arrangement provides a bipolar signal during readout, i.e., one polarity for a stored "1" and an opposite arrangement for a stored "0."

While the invention has been particularly shown and described with reference to preferred embodiments thereof, it will be understood by those skilled in the art that various changes in form and details may be made therein without departing from the spirit and scope of the invention.

What is claimed is:

1. In a memory array, a plurality of magnetic film elements having anisotropic characteristics defining an "easy" axis and a "hard" axis of magnetization, each magnetic film element corresponding to an information bit slot, a first binary state being indicated by a magnetic film element being in a single-domain state, a secondary binary state being indicated by a magnetic film element being in a multi-domain state, and means for reading binary information from said memory array, said readout means including sensing means coupled to said magnetic film elements for sensing the component of flux change along said "easy" axis, and means for applying driving fields to said magnetic film elements at an angle to said "easy" axis.

2. The memory array of claim 1 wherein said magnetic film elements exhibit a self-demagnetizing force greater than said coercive force so as to disassociate into said multi-domain state, and means for storing information in said memory array, said storing means including means for applying biasing fields to particular ones of said magnetic film elements to define said single-domain state.

3. The memory array of claim 2 wherein said applying means are operative to apply said biasing fields to orient the magnetization of said particular magnetic film elements along said "easy" axis.

4. A system comprising a plurality of magnetic film elements having anisotropic characteristics defining an "easy" axis and a "hard" axis of magnetization, anisotropic forces tending to maintain the magnetization of said magnetic film elements along said "easy" axis, a first binary quantity being indicated by a magnetic film element being in a single-domain state, a second binary quantity being indicated by a magnetic film element being in a multi-domain state, interrogating means coupled to said magnetic film elements along said "hard" axis for rotating the magnetization of said magnetic film elements from said "easy" axis, and means coupled to said magnetic film elements for sensing the net component of flux change along said "easy" axis.

5. The system of claim 4 wherein said magnetic film elements have an inherent self-demagnetizing force greater than the coercive force, and means for applying biasing fields to selected ones of said magnetic film elements to define said single-domain state.

6. A memory array comprising a plurality of magnetic film elements having anisotropic characteristics defining an "easy" axis and a "hard" axis of magnetization, said magnetic film elements having an inherent self-demagnetization force in excess of the inherent coercive force whereby said magnetic film elements exhibit a multi-domain state indicative of a first binary quantity, means for applying magnetic fields to selected magnetic film elements to partially overcome said self-demagnetizing force whereby said selected film elements exhibit a single-domain state indicative of a second binary quantity, conductor means aligned along the respective "easy" axes of said magnetic film elements, means for energizing said conductor means to generate driving fields to rotate the magnetization of said magnetic film elements from said "easy" axes, and means coupled to said magnetic film elements for sensing the net change of flux along said "easy" axes upon application of said driving fields.

7. The memory array of claim 6 wherein said applying means includes a permanent magnet positioned adjacent to each of said selected film elements.

8. The system of claim 7 wherein said permanent magnet is supported to apply said magnetic fields along the "easy" axis of said each selected film element.

9. A memory system defined by a number of information bit slots, first magnetic storage means formed of a single magnetic domain and indicating a first binary quantity at selected information bit slots, second magnetic storage means formed of at least two magnetic domains and indicating a second binary quantity at other information bit slots, the respective magnetizations of said domains being oriented in a first direction, first means for applying driving fields to said first and said second magnetic storage elements in a direction transverse to said first direction whereby said respective magnetizations are rotated from said first direction, and readout means for sensing the net flux change in said first direction upon application of said driving fields, the respective contributions to net flux change in said first direction by said at least two domains being subtractive.

10. The memory system of claim 9 wherein the respective magnetizations of said at least two domains are oppositely-aligned in said first direction.

11. The memory system of claim 10 wherein said first and said second magnetic storage means comprise thick magnetic films having anisotropic characteristics and a self-demagnetizing force in excess of the inherent coercive force so as to disassociate into multiple domains oriented in opposite directions along a defined "easy" axis, and further comprising second means for applying biasing fields along said "easy" axis of said first magnetic storage means to at least partially overcome said self-demagnetizing force so as to define a single domain.

12. The memory system of claim 11 wherein the respective "easy" axis of said thick magnetic films are oriented in a same direction.

13. The memory system of claim 12 wherein said first means for applying driving fields comprises conductive means aligned with the "easy" axes of said thick magnetic films and means for energizing said conductive means to generate said driving fields, and said readout means comprises a plurality of sense conductors each aligned transverse to the "easy" axis of a corresponding thick magnetic film for sensing the net flux along said "easy" axis.

14. A read-only memory comprising a plurality of magnetic films having anisotropic characteristics providing an "easy" axis and a "hard" axis of magnetization, said magnetic films having a self-demagnetizing force greater than the inherent coercive force such as to disassociate into multiple domains aligned in parallel but opposite directions along said "easy" axis so as to define a first binary state, an arrangement of magnetic field-generating means for applying biasing fields along the "easy" axes of selected ones of said magnetic films to at least partially overcome the self-demagnetizing force and establish each of said selected magnetic films as a single-domain to define a second binary state, means for applying driving fields along said "hard" axis of each of said magnetic films whereby the magnetizations of each of said magnetic films is rotated from the "easy" axis, and readout means coupled one to each of said magnetic films to sense the net flux change along the "easy" axis.

15. The read-only memory of claim 14 wherein said arrangement of magnetic field-generating means comprises a plurality of permanent magnets and means for supporting said permanent magnets adjacent said selected magnetic films.

16. A read-only memory comprising a plurality of magnetic films having anisotropic characteristics providing an "easy" axis and a "hard" axis of magnetization, said magnetic film having a self-demagnetizing force in excess of the inherent coercive force so as to disassociate into multiple domains aligned in parallel but opposite directions along said "easy" axis to define a first binary state, said magnetic films being arranged in predetermined groups defining a number of word addresses, first means for applying biasing fields along said "easy" axis of selected magnetic films to at least partially overcome the self-demagnetizing force and establish said selected magnetic films in a single-domain to define a second binary state, means coupled to corresponding magnetic films in each of said groups for sensing the component of flux change along the "easy" axis, and interrogating means for applying driving fields to said magnetic films in a predetermined one of said groups, said interrogating means being operative to apply said driving fields in a direction other than along said "easy" axis of said magnetic films in said predetermined group.

17. The read-only memory of claim 16 wherein said first means includes a plurality of permanent magnets, and means for supporting said permanent magnets in predetermined arrangement corresponding to said selected magnetic films.

18. The read-only memory of claim 16 wherein the "easy" axis of each of said magnetic films is oriented in a same direction.

19. The read-only memory of claim 18 wherein said interrogating means includes first conductive means aligned with the "easy" axes of said magnetic films in each of said groups and means for selectively energizing said conductive means, and said sensing means includes second conductive means aligned with the "hard" axes of said corresponding magnetic films in each of said groups.

References Cited

Matick, R. E.: Thick-Film Read-Only Memory Device. Journal of Applied Physics. vol. 34(4), pp. 1173–4. April 1963.

BERNARD KONICK, Primary Examiner

G. M. HOFFMAN, Assistant Examiner